May 6, 1930.  H. E. WARSOP ET AL  1,757,065

MACHINE FOR EMULSIFYING BITUMEN, OTHER MATERIALS, AND THE LIKE

Filed Feb. 16, 1929     3 Sheets-Sheet 1

Inventors
Henry E. Warsop
and Frederick W. Gough
Attorneys

May 6, 1930. H. E. WARSOP ET AL 1,757,065
MACHINE FOR EMULSIFYING BITUMEN, OTHER MATERIALS, AND THE LIKE
Filed Feb. 16, 1929 3 Sheets-Sheet 3

Inventors
Henry E. Warsop
and Frederick W. Gough
By
Attorneys

Patented May 6, 1930

1,757,065

UNITED STATES PATENT OFFICE

HENRY ERNEST WARSOP, OF NOTTINGHAM, AND FREDERICK WILLIAM GOUGH, OF GRIMSBY, ENGLAND

MACHINE FOR EMULSIFYING BITUMEN, OTHER MATERIALS, AND THE LIKE

Application filed February 16, 1929, Serial No. 340,572, and in Great Britain February 18, 1928.

This improved machine consists of a hollow casing in parts, having two central plates, all suitably bolted together.

Inside this casing we have two impellers fixed to and rotating on a driving shaft passing through the machine casing. Each impeller rotates in the space between the casing and the central plate—one on each side of the machine. These impellers are formed in the shape of a concave disc with a number of ribs formed thereon radiating from the central boss to a ring or rim formed on the periphery which rotates against the face of the central plate, and are fixed on the driving shaft in opposite directions.

A number of small holes are formed in each centre plate near the edge thereof for the passage of the bitumen and the like to be emulsified so as to pass through in small jets in opposite directions into the chamber between the two central plates.

In this chamber we have a third impeller fixed on the driving shaft and formed with open sides, an outer rim and spokes radiating therefrom to the central boss.

The action of the whole is such, that the crude bitumen and the like, with any other ingredients to be mixed with it, are delivered into the machine through inlet passages formed in the casing on each side, thence passing along until they pass through inlets at the centre of the impellers, and into the spaces formed between ribs thereon, by which the mixture is rapidly rotated and an emulsifying and churning action of the ingredients ensues. This action at the same time creates a pressure sufficiently powerful to force the liquid and the like through the small holes into the central space into which it enters in opposite directions in small jets, thus further inducing a thorough breaking up and mixture of the ingredients, so as to produce a perfectly emulsified finished product.

The action of the impeller in the central chamber is for use as a further means of breaking up and mixing all the materials, and for acting as a centrifugal pump to deliver the emulsified product for use.

In some cases where desirable the outer casing of the machine may be formed with a jacket for steam or water.

The whole being mounted on a baseplate, together with one or more suitable bearings for carrying the driving shaft, which is actuated by the usual means.

In order that our invention may be readily understood and more easily carried out and into effect, we will now describe it fully by reference to the accompanying drawings, in which similar letters of reference and numerals refer to the same parts throughout the several figures.

Figure 3 is a sectional elevation on line 3—4 of Figure 2.

Figure 1:
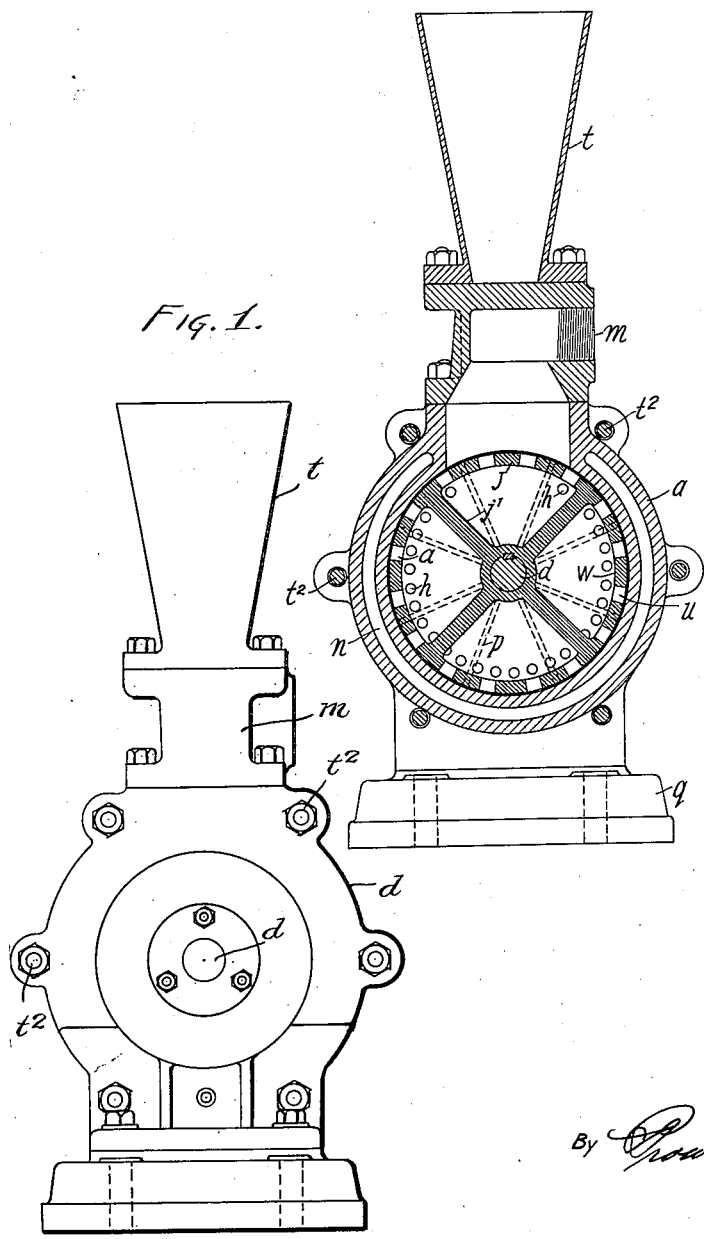
Figure 1 is an end elevation of our improved emulsifying machine.
Figure 2:
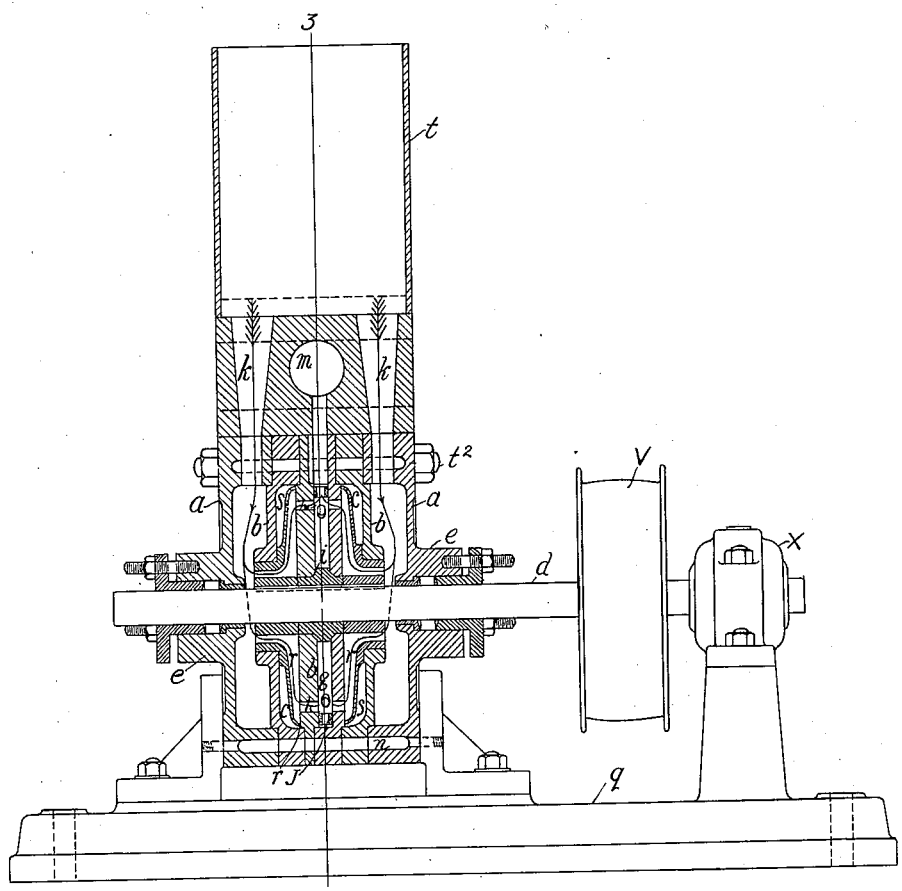
Figure 2 is a sectional transverse elevation of the same machine on line 1—2 of Figure 1.
Figure 4:
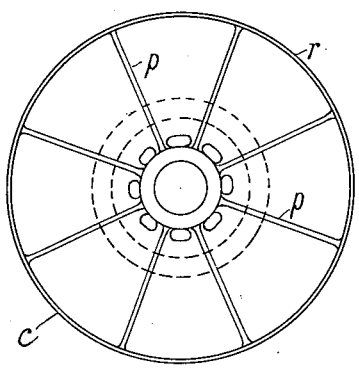
Figures 4 and 5 are enlarged views—front elevation and side view partly in section respectively—of the two impellers $c$.
Figure 5:
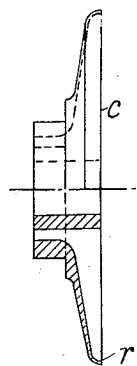
Figure 6:
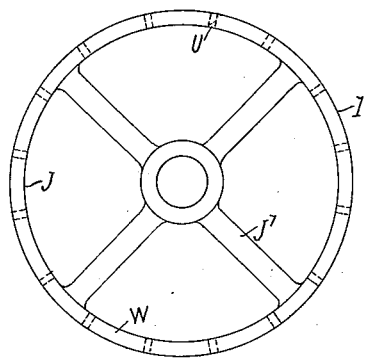
Figures 6 and 7 are enlarged views—front elevation and side view respectively—of the central impeller $i$.
Figure 7:
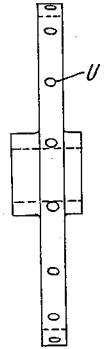

In these views $a$ represents the hollow casing in parts, with the central plates $b$, all suitably bolted together by bolts $t^2$.

Inside this casing we have two impellers $c$ fixed to and rotating with the driving shaft $d$ passing through the machine casing $a$ at each side in the glands $e$ formed thereon. Each impeller $c$ rotates in the space $s$ between the casing $a$ and the central plates $b$, one on each side of the machine. These impellers $c$ are formed in the shape of a concave disc with a number of ribs $p$ formed thereon and radiating from the centre boss to a ring or rim $r$ formed on the periphery, which rotate against the faces of the central plates $b$, and are fixed on the driving shaft $d$ in opposite directions.

A number of small holes $h$ are formed in each centre plate $b$ near the edge thereof for the passage therethrough of the bitumen and the like to be emulsified, so as to pass through same in small jets in opposite directions into the chamber $g$ between the centre plates $b$.

In this chamber $g$ we have a third or central breaking up impeller $i$ fixed on the driving shaft $d$ and formed with open sides, an outer rim $j$ and spokes $j^1$ radiating from the central boss, also a rim $w$ with a number of small holes $u$ formed therein.

The action of the whole is such, that the crude bitumen and the like together with any other ingredient to be mixed with it, are delivered into the machine through the inlet passages $k$ formed in the casing $a$ on each side, thence passing along in the direction of the arrows until they pass through the inlets $k^2$ at the centre of the impellers $c$, and into the spaces formed between the ribs thereon, by which the mixture is rapidly rotated and an emulsifying and churning action of the ingredients ensues. This action at the same time creates a pressure sufficiently powerful to force the liquid and the like through the small holes $h$ into the central space or chamber $g$, which it enters in opposite directions in small jets, thus further inducing a thorough breaking up and mixture of the ingredients, so as to produce a perfectly emulsified finished product.

The action of the central impeller $i$ in the central chamber $g$ is for use as a further means of breaking up and mixing all the materials, and for acting as a centrifugal pump to deliver the emulsified product for use through the delivery outlet $m$.

In some cases where desirable, the outer casing $a$ of the emulsifier may be formed with a jacket $n$ for steam or water, and one or more central breaking up impellers $i$ may be used where essential.

The whole is mounted preferably on a baseplate $q$, together with one or more suitable bearings $x$ for carrying the driving shaft $d$, which is actuated by the pulley $v$ in the usual manner, or by other suitable means. The hopper $t$ represents the receptacle into which the ingredients are delivered in their crude state to be emulsified.

In other cases the central impeller $i$ may be dispensed with, so that the delivery of the emulsified product would be effected almost entirely by the pressure created by the two impellers $c$ in the outer chamber $a$.

Having now particularly described and ascertained the nature of our said invention, and in what manner the same is to be performed, we declare that what we claim is:—

1. The combination, in an emulsifying or mixing machine, of a casing, a driving shaft therein, two rotary concaved feeding impellers on said shaft, each of said impellers having radial ribs and an annular rim, said ribs and rims facing in opposite directions, two fixed breaking-up perforated plates between the impellers, a delivery impeller formed with a perforated rim fixed on the driving shaft and rotatable between the breaking-up plates, said casing having inlet means communicating with the feeding impellers and having outlet means to receive the material from the delivery impeller.

2. In an emulsifying or mixing machine, the combination of a casing, two perforated breaking-up plates fixed therein and providing a chamber therebetween, a delivery impeller rotating in said chamber, and two feeding impellers each rotating against the outer face of the breaking-up plates.

3. In emulsifying or mixing machines, in combination, two rotary feeding impellers, a driving shaft carrying said impellers, two perforated breaking-up plates against which the impellers operate, said plates being spaced apart to form a chamber therebetween to receive the material from the delivery impellers, a delivery impeller rotating in said chamber, and a casing containing the parts.

4. In an emulsifying or mixing machine, the combination of a vertical, laterally perforated breaking-up plate disposed therein, a feeding impeller rotating on a horizontal axis and against said plate and means on the opposite side of said plate to said impeller to deliver material after passage through the plate.

5. In an emulsifying or mixing machine, the combination of a laterally perforated breaking-up plate disposed therein, a feeding impeller rotating against said plate, said feeding impeller having its inlet adjacent the axis of rotation and a delivery impeller for material passing through said plate.

6. In an emulsifying or mixing machine, the combination of a perforated breaking-up plate disposed therein, a feeding impeller rotating against said plate and a delivery impeller engageable by the material after passage through said plate.

In witness whereof we have hereunto set our hands.

HENRY ERNEST WARSOP.
FREDERICK WILLIAM GOUGH.